United States Patent

[11] 3,584,439

| [72] | Inventor | Donald D. Gronholz |
| | | Minneapolis, Minn. |
| [21] | Appl. No. | 738,467 |
| [22] | Filed | June 20, 1968 |
| [45] | Patented | June 15, 1971 |
| [73] | Assignee | Donaldson Company, Inc. |
| | | Minneapolis, Minn. |

[54] FLUID CLEANER
3 Claims, 4 Drawing Figs.

[52] U.S. Cl. .................................................. 55/337,
55/432, 55/435, 55/456, 55/481, 55/498, 55/510, 55/521
[51] Int. Cl. ........................................................ B01d 50/00
[50] Field of Search ........................................... 55/337,
418, 419, 432, 447, 456, 459, 435, 481, 498, 510, 521; 210/304, 512

[56] References Cited
UNITED STATES PATENTS

| 1,950,020 | 3/1934 | Bleibtreu et al. | 55/440 X |
| 2,152,114 | 3/1939 | Van Tongeren | 55/398 |
| 2,188,547 | 1/1940 | Anderson | 55/394 X |
| 2,346,672 | 4/1944 | Fletcher | 55/348 |
| 2,436,159 | 2/1948 | Acheson | 55/337 X |
| 2,511,713 | 6/1950 | Hoyle et al. | 55/449 X |
| 2,911,066 | 11/1959 | Neely | 55/419 |
| 3,307,336 | 3/1967 | Dewsberry | 210/304 X |

FOREIGN PATENTS

| 196,666 | 3/1958 | Austria | 55/330 |

*Primary Examiner*—Dennis E. Talbert, Jr.
*Attorney*—Merchant and Gould

ABSTRACT: A generally cylindrical hollow housing having an inlet and an outlet therein and having a generally cylindrical pervious filter element mounted therein so as to leave a passageway between the pervious filter element and the inner surface of the housing substantially therearound and so that all fluid passing through the housing from the inlet to the outlet must pass through the pervious filter element. Vaned means, mounted within the housing inlet, including a plurality of members having a surface formed to direct all fluid entering the inlet into the housing in generally spiral shaped paths around the pervious filter element to produce centrifugal separating action within the housing prior to passage of the fluid through the pervious filter element.

PATENTED JUN 15 1971  3,584,439

INVENTOR.
DONALD D. GRONHOLZ
BY
Merchant & Gould
ATTORNEYS 3,584,439

FLUID CLEANER

BACKGROUND OF THE INVENTION

1. Field of the Invention

As the various machines become more intricate and sophisticated it becomes increasingly more important to filter all fluids utilized thereby. This is especially true of machines being utilized where the air is exceedingly dusty and dirty, such as earth working machines. In many of these machines it is extremely important that the air intake to the engines be filtered to remove substantially all foreign particles therefrom prior to use by the engine.

2. Description of the Prior Art

In the prior art air or other fluid is filtered or cleaned by passing it directly into a housing having a pervious filter element therein. Once the housing the fluid must generally turn approximately 90° and travel between the filter element and the housing through a plurality of radially extending fins, which impart arcuate or spiral shaped motion to the fluid. This arcuate motion causes much of the foreign matter to be centrifugally forced outwardly while the fluid gradually moves inwardly and through the pervious filter element. Because the fins extend between the pervious filter element and the housing, they must be attached to either the filter element or the housing. Thus, to make the filter element removable, the opening must either be extremely large (and difficult to properly seal) or the fins must be permanent within the housing (making the housing difficult to clean). Also, with the fins extending radially the housing must be substantially larger than the filter element to provide a sufficient passage for fluid therebetween.

SUMMARY OF THE INVENTION

The present invention pertains to an improved fluid cleaner including a hollow housing having an inlet and an outlet therein and fluid pervious filter means mounted therein to provide a passageway for fluid between the outer surface of said filter element and the inner surface of said housing so that all fluid passing from said inlet to said outlet must pass through said pervious filter element and vaned means within said inlet for directing substantially all fluid entering said inlet into generally spiral shaped paths about said pervious filter element.

It is an object of the present invention to provide a new and improved fluid cleaner.

It is a further object of the present invention to provide an improved fluid leaner wherein fluid entering the inlet is directed into substantially spiral spiral-shaped about the pervious filter element by vanes mounted within the inlet.

It is a further object of the present invention to provide an improved fluid cleaner having a pervious filter element therein with an increased efficiency and life span.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
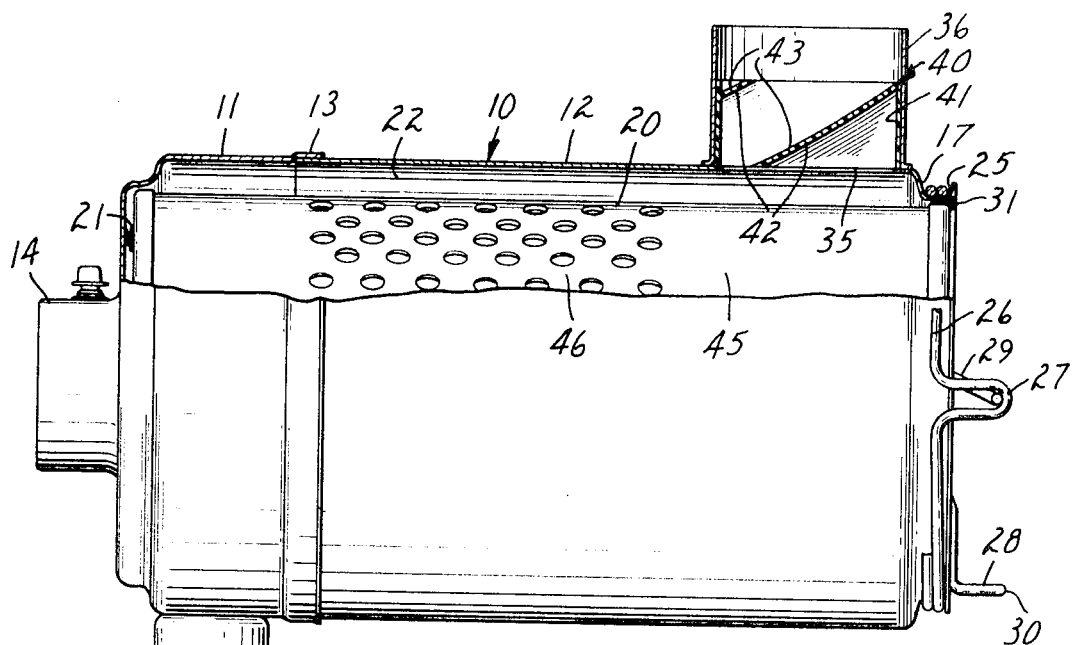
FIG. 1 is a view in side elevation of the improved fluid cleaner, parts thereof broken away and shown in section.

In the figures the numeral 10 generally designates an elongated cylindrical housing. The housing 10 is constructed from a cup-shaped portion 11, having a generally circular cross section, and a tubular portion 12 fixedly attached in a generally coaxial relationship by welding or the like along seam 13. The closed end of the cup-shaped portion 11 has a generally coaxial opening therein with a section of conduit 14 fixedly attached thereto to form an outlet. An automatic dust unloading valve 15 is affixed to the lower side of the cup-shaped portion 11 so as to be in communication with the inner opening of housing 10 and to extend downwardly from the lower side thereof. The automatic dust unloading valve 15 has resilient lips 16 which are normally closed to prevent the ingress of air therethrough but which open to allow dust to egress therefrom. The end of the tubular portion 12 opposite the end attached to the cup-shaped portion 11, designated 17, is open.

A generally cylindrical pleated, fluid pervious filter element 20 is coaxially mounted within the housing 10 and extends substantially the length of the cup-shaped portion 11 and the tubular portion 12. A resilient ring-shaped gasket 21 is positioned between the inner surface of the end of the cup-shaped portion 11 and the juxtaposed end of the filter element 20. The filter element 20 is forced tightly against the gasket 21 which is in turn forced tightly against the end of the cup-shaped portion 11 to prevent the passage of fluid therebetween. The filter element 20 is generally tubular in shape and has a central opening which is in communication with the outlet conduit 14. The outer diameter of the filter element 20 is substantially smaller than the inner diameter of the housing 10, except for the extreme ends thereof, so that a passageway 22 is formed therebetween which extends substantially the length of the housing 10 and completely encircles the filter element 20.

The tubular portion 12 adjacent the end 17 is bent inwardly so that the inner diameter thereof is only slightly larger than the outer diameter of the filter element 20 and an outwardly opening groove 25 is formed which completely encircles the end 17. A relatively stiff piece of rod 26 is formed into a pair of loops 27 which extend generally longitudinally outwardly from the end 17 of the tubular portion 12 on either side thereof and the remainder of the rod 26 is formed to lie in the groove 25 and extend substantially therearound. Thus, the loops 27 are fixedly attached to the tubular portion 12 and form a mounting bracket for a second rod 28 which is bent so that the ends thereof extend radially outwardly through the loops 27 to pivotally mount the remainder of the rod 28. The remainder of the rod 28 is formed into an overcenter cam arrangement 29 and a handle 30 which tightly engage the filter element 20 and press it firmly against the gasket 21 in the cup-shaped portion 11. A resilient ring-shaped gasket 31 with a generally T-shaped cross section is engaged between the end of the filter element 20 and the end 17 of the tubular portion 12 to prevent the flow of fluid therebetween.

An inlet 35 includes a generally oval-shaped opening in the upper surface of the housing 10 adjacent the end 17, positioned so that the longitudinal axis thereof lies along a circumference of the housing 10 and a conduit 36. The conduit 36 has one end which is shaped generally like the oval-shaped opening through the housing 10 and tapers generally inwardly and upwardly to the other end which has a generally circular-shaped cross section. The oval-shaped outlet opening of the conduit 36 is slightly larger than the oval-shaped opening through the housing 10 for reasons which will become apparent presently.

A vane assembly generally designated 40 includes an outer body or housing 41 with dimensions similar to but slightly smaller than the conduit 36 of the inlet 35 so that the vane assembly 40 fits snugly within the conduit 36. The body 41 is generally tubular so that fluid can flow freely therethrough in a generally axial direction. The vane assembly 40 is held fixedly in place within the inlet 35 by fitting it snugly within the conduit 36 and fixedly attaching the conduit 36 over the oval-shaped opening in the housing 10 by means of welding or the like. Because the oval-shaped opening through the housing 10 is slightly smaller than the oval-shaped opening at the outlet end of the conduit 36 and also slightly smaller than the body 41 of the vane assembly 40, the vane assembly 40 is held immovably in the correct position by the conduit 36.

Figures 2, 3:
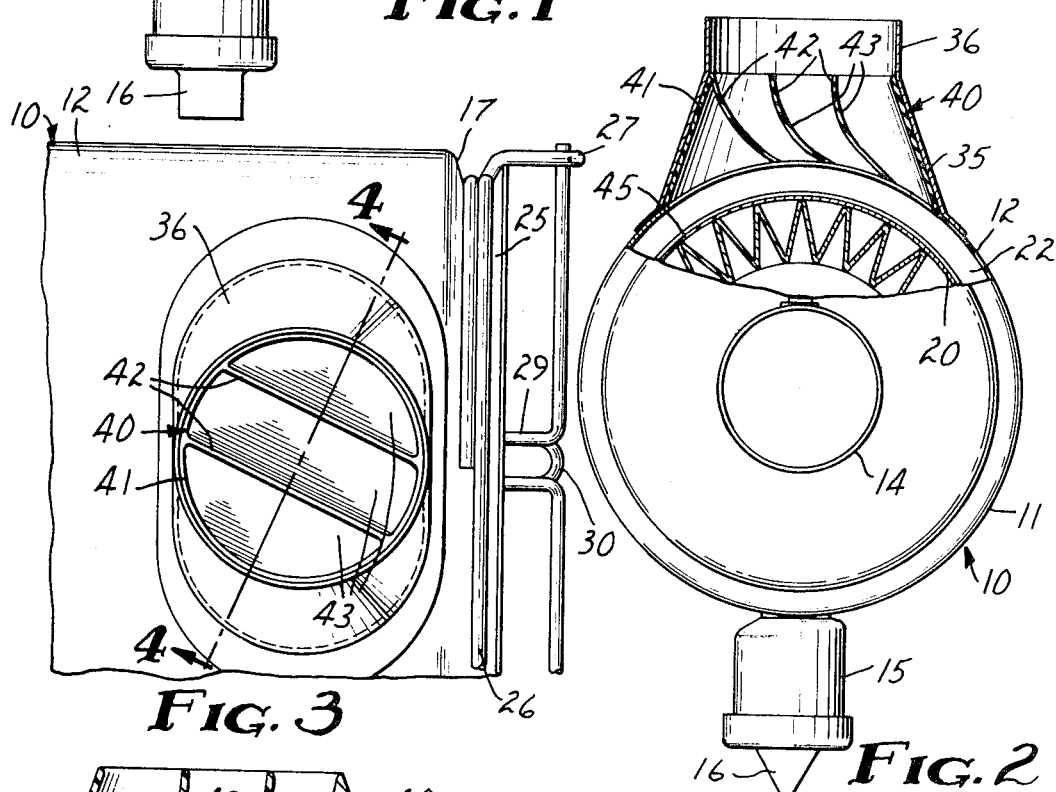
FIG. 2 is a view in end elevation as seen from the left end of FIG. 1, parts thereof broken away and shown in section.
FIG. 3 is an enlarged view in top plan of the fluid cleaner in FIG. 1, parts thereof removed.
Figure 4:
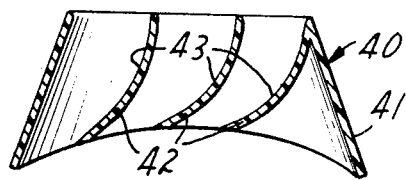
FIG. 4 is a sectional view of the vaned means as seen from the line 4—4 in FIG. 3.

The body 41 of the vane assembly 40 has a plurality of vanes 42 therein each of which has a surface 43 which is generally arcuately shaped. The vanes 42 are positioned in the body 41 so that they form an angle of approximately 25° with the longitudinal axis of the housing 10, see FIG. 3. The arcuate curvature of the surfaces 43 of the vanes 42 is such that fluid entering the inlet 35 is directed into the passageway 22 in a spiral shaped path around the filter element 20 and toward the closed end of the cup-shaped portion 11. In the present embodiment the vane assembly 40 is molded of plastic or the like and positioned within the inlet 35, however, it should be understood that the vanes might be fixedly attached to the conduit 36 or formed as a part thereof. Also, the vanes might vary considerably in size, number and position while still performing the functions of the present invention.

A tubular member 45, having an inner diameter approximately equal to the extreme outer diameter of the filter element 20, is positioned approximately coaxially over the filter element 20 and extends the length thereof. The tubular ember 45 is constructed of metal or other fluid impervious material and is fixedly attached to the filter element 20 adjacent the ends thereof so that no fluid can flow therearound. A generally centrally located section 46 of the tubular member 45, lying between the automatic dust unloading valve 15 and the inlet 35 is perforated around the entire circumference to allow fluid to flow freely therethrough. The section of the tubular member 45 adjacent the inlet 35 is imperforate and the section adjacent the automatic dust unloading valve 15 is imperforate.

In the operation of the fluid cleaner contaminated fluid is supplied to the inlet 35 and the clean fluid is removed from the outlet conduit 14. A flow through the cleaner may be produced either by pressurizing the fluid at the inlet 35 or drawing the fluid through the cleaner by means of a vacuum or the like at the outlet conduit 14. As fluid flows into the inlet 35 it is directed into spiral shaped paths within the passageway 22 by the surfaces 43 of the vanes 42. The spiraling fluid forms a vortex in the passageway 22 adjacent the housing 10 which tends to change direction axially as it approaches the closed end of the cup-shaped portion 11. With the axial change in direction the spiraling fluid forms a smaller vortex within the previously described vortex, which smaller vortex is traveling within the passageway 22 toward the end 17 of the housing 10. Actually the axial change of direction of the spiraling fluid, or the mass transfer of fluid from the outer vortex to the inner vortex, takes place gradually over the entire length of the passageway 22 between the end of the cup-shaped portion 11 and the inlet 35. The imperforate section of the tubular member 45 below the inlet 35 prevents fluid from entering the filter element 20 directly from the inlet 35 and enhances the formation of the vortices within the passageway 22. Also, the imperforate section of the tubular member 45 adjacent the closed end of the cup-shaped portion 11 prevents the buildup of foreign particles on he filter element 20 at that end, since most of the foreign particles are carried into the cup-shaped portion 11 by the spiraling fluid, and allows the foreign particles to fall to the bottom of the housing 10 where they egress through the automatic dust unloading valve 15. The fluid spiraling toward the closed end of the cup-shaped portion 11 in the outer vortex produces centrifugal force on foreign particles entrained therein forcing the particles outwardly against the inner surface of the housing 10. The returning fluid in the inner or smaller vortex is relatively clean and, upon reaching the perforated section 46 of the tubular member 45 passes through the filter element 20 and out the conduit 14. Thus, a substantial portion of the foreign material entrained in the fluid is removed by centrifugal separating action prior to passage of the fluid through the filter element 20 and the life span of the filter element 20 is greatly increased.

Because the vane assembly 40 is located within the inlet 35 in the present cleaner, the size of the filter element 20 relative to the housing 10 can be increased, which increased element area permits the use of a larger diameter outlet conduit 14. Also, because the vane assembly provides a transition from the circular to the oval cross section which allows fluid to enter the passageway 22 with less restriction, there is a more nearly constant fluid flow area throughout the cleaner. The combination of the larger diameter outlet plus the nearly constant fluid flow area throughout the cleaner reduces turbulence and, consequently, reduces restriction to the flow of fluid through the cleaner. It should be understood that the present position of the inlet 35 is simply for exemplary purposes. The inlet 35 might be positioned substantially anywhere on the housing 10 and it will provide substantially all of the advantages of the present embodiment.

Further advantages in the present apparatus wherein the vane assembly is placed within the inlet 35, over the prior art assembly wherein the vanes extend radially between the filter element and the housing, are as follows. The increased size of the filter element 20 relative to the housing 10 provides a cleaner with an increased service life or capacity over prior art cleaners of the same size. Because there is no integral fin extending radially inwardly from the housing 10 the interior of the housing 10 is easier to clean and service. Since the diameters of the filter element 20 and the housing 10 are near or to the same size, than in prior art devices, the end 17 is easier to seal and the opening therein is of a minimum size. The overall efficiency of the cleaner is increased while the cost is reduced.

I claim:

1. An improved fluid cleaner comprising:
  a. a generally cylindrical hollow housing having an outwardly extending tubular inlet affixed thereto and an outlet;
  b. generally cylindrical fluid pervious filter means;
  c. means mounting said pervious filter means within said housing to provide a passageway for fluid between the outer surface of said filter means and an inner surface of said housing so that all fluid moving through said housing from said inlet to said outlet must pass through said pervious filter means; and
  d. vane means including a plurality of spaced apart members each being formed to present a generally arcuate surface to incoming fluid and each of said members being positioned within the inlet with the arcuate surface canted at an acute angle to the longitudinal axis of said pervious filter means and further canted so as to be substantially tangential to said pervious filter means so that the incoming fluid is directed into generally spiral shaped paths about and progressing axially along said pervious filter means.

2. An improved fluid cleaner as set forth in claim 1 wherein the inlet of the housing is a section of conduit affixed to said housing having an outlet opening in communication with the passageway for fluid in said housing and an inlet opening substantially smaller than said outlet opening.

3. An improved fluid cleaner s set forth in claim 1 including an element mounted between the pervious filter means and the housing inlet having a fluid impervious portion adjacent the housing inlet to prevent fluid from traveling directly from the housing inlet through the pervious filter means.